US011866103B2

(12) United States Patent
Büker

(10) Patent No.: US 11,866,103 B2
(45) Date of Patent: Jan. 9, 2024

(54) STEERING APPARATUS WITH A BLOCKING DEVICE FOR LIMITING A STEERING ANGLE OF ROTATION, AND STEER-BY-WIRE STEERING SYSTEM WITH SUCH A STEERING APPARATUS

(71) Applicant: ZF Automotive Germany GmbH, Alfdorf (DE)

(72) Inventor: Richard Büker, Willich (DE)

(73) Assignee: ZF Automotive Germany GmbH, Alfdorf (DE)

( * ) Notice: Subject to any disclaimer, the term of this patent is extended or adjusted under 35 U.S.C. 154(b) by 0 days.

(21) Appl. No.: 17/984,314

(22) Filed: Nov. 10, 2022

(65) Prior Publication Data
US 2023/0141259 A1    May 11, 2023

(30) Foreign Application Priority Data

Nov. 10, 2021 (DE) .......................... 102021212670.7

(51) Int. Cl.
*B62D 5/00* (2006.01)
*G05G 5/04* (2006.01)
*H01F 7/08* (2006.01)

(52) U.S. Cl.
CPC ............... *B62D 5/001* (2013.01); *G05G 5/04* (2013.01); *H01F 7/081* (2013.01)

(58) Field of Classification Search
CPC .......... B62D 1/286; B62D 3/02; B62D 5/001; B62D 5/006; B62D 5/0421; B62D 5/0424;
(Continued)

(56) References Cited

U.S. PATENT DOCUMENTS 7,140,465 B2 * 11/2006 Dominke .............. B62D 5/003
180/402
9,381,934 B2 * 7/2016 Ulrich ................... B62D 5/006
(Continued)

FOREIGN PATENT DOCUMENTS

DE           10057242 A1    5/2002
DE      102010042431 A1    4/2012
(Continued)

OTHER PUBLICATIONS

Machine translation of DE 102010042431 A1 obtained on Jun. 8, 2023.*

*Primary Examiner* — Adam D Rogers
(74) *Attorney, Agent, or Firm* — Kristin L. Murphy

(57) ABSTRACT

The disclosure relates to a steering apparatus with a blocking device for limiting a steering angle of rotation, wherein the blocking device has a blocking element movable between a locking position and a release position, and with a shaft which is mounted rotatably about its centre longitudinal axis. When in the locking position, the blocking element interacts with a blocking contour in order to stop a rotational movement of the shaft. The blocking element is movable by the actuator for interaction with the blocking contour. The steering angle of rotation for the steering apparatus can be limited in two directions of rotation directed facing away from each other by the blocking element, wherein both a first end stop position in a first direction of rotation and a second end stop position in a second direction of rotation opposed to the first direction of rotation can be predefined by the blocking element and in interaction with the blocking contour.

16 Claims, 2 Drawing Sheets

(58) Field of Classification Search
CPC ... B62D 5/30; G05G 5/04; G05G 5/05; G05G 5/06; H01F 7/081
See application file for complete search history.

(56) References Cited

U.S. PATENT DOCUMENTS

| | | | |
|---|---|---|---|
| 10,989,251 B2* | 4/2021 | Khale | B62D 1/20 |
| 11,254,350 B2* | 2/2022 | Ashida | B62D 5/04 |
| 2022/0379950 A1* | 12/2022 | Yeom | B62D 5/005 |
| 2022/0402541 A1* | 12/2022 | Yeom | B62D 5/001 |
| 2023/0174150 A1* | 6/2023 | Kim | B62D 6/008 |
| | | | 701/41 |

FOREIGN PATENT DOCUMENTS

| | | | |
|---|---|---|---|
| DE | 102013004056 B4 | | 3/2021 |
| DE | 102019219392 A1 | * | 6/2021 |
| EP | 2960135 B1 | | 4/2017 |
| JP | 2007269278 A | * | 10/2007 |
| KR | 20080088075 A | * | 10/2008 |
| KR | 20100063433 A | * | 6/2010 |
| KR | 20220031336 A | * | 3/2022 |
| WO | WO-2017182502 A1 | * | 10/2017 |

* cited by examiner

STEERING APPARATUS WITH A BLOCKING DEVICE FOR LIMITING A STEERING ANGLE OF ROTATION, AND STEER-BY-WIRE STEERING SYSTEM WITH SUCH A STEERING APPARATUS

CROSS-REFERENCE TO RELATED APPLICATION

This application claims priority to German Priority Application No. 102021212670.7, filed Nov. 10, 2021, the disclosure of which is incorporated herein by reference in its entirety.

TECHNICAL FIELD

The disclosure relates to a steering apparatus with a blocking device for limiting a steering angle of rotation, wherein the blocking device has a blocking element which is movable between a locking position and a release position, and with a shaft which is mounted rotatably about its centre longitudinal axis, wherein, in the locking position, the blocking element interacts with a blocking contour, which is connected to the shaft for rotation therewith, in order to stop a rotational movement of the shaft, and the blocking device has an electromagnetic or electromechanical actuator, wherein the blocking element is movable by the actuator for interaction with the blocking contour. Furthermore, the disclosure relates to a steer-by-wire steering system with such a steering apparatus.

BACKGROUND

In the case of a steer-by-wire steering system, there is no mechanical connection between a steering wheel and a steering gear. Steering commands are therefore transmitted by a control unit to an electric motor which, via the steering gear, displaces or moves a rack for steering the wheels. The rack can adjust a steering angle at the wheels by track rods here. The steering apparatus preferably has a feedback motor which simulates steering forces in order to provide the driver with feedback from the steering forces which are in action.

In the case of a conventional steering system with a mechanical connection between the steering wheel and the rack, the steering angle of rotation of a steering wheel is limited because of the predetermined mechanism. By contrast, due to the lack of a mechanical connection between the steering apparatus and the steering gear in a steer-by-wire steering system, it would be possible to rotate the steering wheel endlessly in a direction of rotation. However, there is thus the risk of overloading or damaging components of the steering apparatus. In addition, the driver requires feedback about the maximally achievable steering angle at the wheels.

The steering apparatus mentioned at the beginning therefore comprises a blocking device for limiting the steering angle of rotation. In particular, limiting the steering angle of rotation should be understood as meaning that the shaft of the steering apparatus and/or a steering wheel which is connected to the shaft can rotate only within a predetermined angular range and between two end stop positions.

SUMMARY

The disclosure relates to a steering apparatus. The steering apparatus can have a steering wheel or can be connected to a steering wheel. The term steering wheel is a synonym here for a steering handle of any shape and/or form. In particular, the steering apparatus is designed for a motor vehicle and/or for steering a motor vehicle. The steering apparatus has a blocking device for limiting a steering angle of rotation. The blocking device has a blocking element which is movable between a locking position and a release position. In particular, the blocking device and/or the blocking element is controllable. A control device can be provided for controlling the blocking device and/or the blocking element. The control device is preferably a component of the steering apparatus. In particular, the blocking device and/or the blocking element are/is controlled by signals from a steering angle of rotation sensor.

The steering apparatus has a shaft which is mounted rotatably about its centre longitudinal axis. In particular, the shaft is rotatable about the centre longitudinal axis in two directions of rotation directed facing away from each other. The steering angle of rotation and therefore the rotation of the shaft about its centre longitudinal axis in the two directions of rotation is limited or can be limited here by the blocking device. The blocking device preferably permits rotation of the shaft and/or of the steering wheel connected to the shaft only within a predetermined steering angle of rotation range and between two end stop positions which are predefined or can be predefined by the blocking device. The shaft can be designed or can be referred to as a steering shaft. Furthermore, the shaft can be formed integrally or in multiple parts.

The steering apparatus can have a feedback motor. In this case, the shaft can be set by the feedback motor into the rotational movement about the centre longitudinal axis of the shaft, in particular with the interconnection of a transmission, and/or can provide a controllable torque resistance. The driver of a vehicle or motor vehicle with such a steering apparatus can be provided with feedback from the steering forces acting on the wheels. In particular, the feedback motor is designed as an electric motor.

In the locking position, the blocking element interacts with a blocking contour, which is connected to the shaft for rotation therewith, in order to stop a rotational movement of the shaft. For this purpose, the blocking device has an electromagnetic or electromechanical actuator, wherein the blocking element is movable by the actuator in order to interact with the blocking contour. In particular, in the locking position, the blocking element engages in the blocking contour. The blocking device and/or the blocking element is preferably arranged in a fixed position and/or immovably with respect to the shaft, for example on a housing or housing cover.

The steering angle of rotation in two directions of rotation directed facing away from one another can be limited and/or is limited by the blocking element, wherein both a first end stop position in a first direction of rotation and a second end stop position in a second direction of rotation opposed to the first direction of rotation can be predefined and/or is predefined by the blocking element and in interaction with the blocking contour.

It is advantageous here that a single blocking device and/or a single blocking element suffices to limit or to block the rotation of the shaft both in the first direction of rotation and in the second direction of rotation opposed to the first direction of rotation. Therefore, both the first end stop position and the second end stop position can be realized with a single blocking device and/or a single blocking element. A more compact and/or more cost-effective design is thereby made possible. It is possible to avoid having to provide two blocking devices, in order to be able to limit the steering angle of rotation in both directions of rotation. In particular, other arrangements are made possible.

According to a further exemplary arrangement, the blocking device has a restoring device for transferring the blocking element from the locking position into the release position. In particular, the restoring device here is designed as a non-mechanical restoring device. The restoring device is used to exert a force which acts on the blocking element and pulls or pushes the blocking element out of the blocking contour.

The restoring device can have a restoring element acting on the blocking element. The restoring device can act on the blocking element for transferring the blocking element from the locking position into the release position by a spring force. A corresponding restoring element can be designed as a spring, for example as a compression spring, spiral spring, leaf spring or wave spring. In particular, the restoring device and/or the restoring element acts counter to a movement of the blocking element for interacting with the blocking contour. When an actuator is activated, this force of the restoring device and/or of the restoring element is overcome, and therefore the blocking element is moved in the direction of the blocking contour counter to the force of the restoring device and/or of the restoring element. The blocking element can preferably be transferred back from the locking position and from an end stop position into the release position by the restoring device when the direction of rotation is reversed and/or an actuator is deactivated. It is therefore possible to ensure by the restoring device and/or the restoring element that the blocking element can be reliably transferred from the locking position into the release position. The blocking element is preferably held in the release position by the restoring device and/or the restoring element. This makes it reliably possible to prevent the blocking element from passing, when an actuator is deactivated and therefore unintentionally, from the release position into the locking position.

The restoring device can act on the blocking element for transferring the blocking element from the locking position into the release position by a magnetic force. The blocking element can therefore be moved from the locking position into the release position by magnetic force. In particular, the restoring device has a permanent magnet for interacting with a metal part or iron core. The permanent magnet is preferably arranged on or fastened to the blocking element. The metal part or the iron core can be part of the actuator. For example, the actuator can be designed as an electromagnet with an iron core. If such an actuator or such an electromagnet is deactivated, the permanent magnet and therefore the blocking element is pulled in the direction of the iron core. When an actuator is activated or an electromagnet is activated, the magnetic force between the permanent magnet of the blocking element and the iron core is overcome and, instead, the blocking element and the permanent magnet are repelled from the actuator.

According to a development, the blocking element is guided in a linearly displaceable manner in a guide. The guide can be designed as an integral or single-piece component of a housing or of a housing cover. In particular, a guide channel of the guide is formed in a housing or housing cover. The guide channel can extend parallel to the centre longitudinal axis of the shaft. A guide protrusion of the blocking element preferably engages slidably in the guide channel.

In particular, the blocking element is arranged in the guide in a manner displaceable parallel to the centre longitudinal axis of the shaft. This results in a particularly compact design of the steering apparatus with the blocking device. This arises in particular in comparison to another arrangement, in which the guide and/or a guide channel is arranged radially or at a right angle to the centre longitudinal axis of the shaft and therefore the blocking element is also arranged in the guide in a manner displaceable radially or at a right angle to the centre longitudinal axis of the shaft.

The blocking element can be designed in the manner of a bolt or in the manner of a piston. In particular, a portion of the blocking element that interacts with the blocking contour is designed in the manner of a bolt or in the manner of a piston. The blocking contour interacting with the blocking element in the locking position of the blocking element can be designed as a depression, in particular in the manner of a blind hole or in the manner of a groove or in the manner of an annular portion.

According to a further exemplary arrangement, the actuator is designed as a controllable electromagnet, in particular with an iron core, or as a cylindrical coil. According to the last-mentioned exemplary arrangement of the actuator, the actuator can therefore be designed as a solenoid. In particular if the actuator is designed as a cylindrical coil or as a solenoid, the actuator can be activated both for transferring the blocking element from the release position into the locking position and also for transferring the blocking element from the locking position into the release position. However, the actuator, in particular if the actuator is designed as a controllable electromagnet, is preferably activated for transferring the blocking element from the release position into the locking position and deactivated for transferring the blocking element from the locking position into the release position. In particular, the blocking element is transferred here from the locking position into the release position by the restoring device when the actuator is deactivated.

According to a development, an annular body which is connected to the shaft for rotation therewith has the blocking contour for interacting with the blocking element. The annular body is therefore arranged in a fixed position on the shaft and/or about the shaft or is held on the shaft. When the shaft rotates about its centre longitudinal axis, the annular body therefore rotates at the same time. The annular body has at least one blocking contour or a plurality of blocking contours for partially receiving and fastening the blocking element in the locking position. The blocking contour preferably has two mutually opposite stop surfaces for fastening the blocking element in the first end stop position or in the second end stop position. In particular, the stop surface acts counter to a further rotational movement of the shaft in the direction of rotation directed at the blocking element. The stop surface is preferably oriented radially with respect to the centre longitudinal axis of the shaft. In particular, the stop surface is oriented both radially and also parallel to the centre longitudinal axis of the shaft.

The annular body can be designed as a toothed wheel. The toothed wheel here can have a plurality of blocking contours on its outer circumference. In another example, the annular body can be designed as a worm wheel. The toothed wheel or the worm wheel can be connected to the feedback motor, in particular with the interposition of a transmission. When the annular body is designed as a worm wheel, at least one blocking contour or a plurality of blocking contours can be formed in an annular portion oriented at a right angle to the centre longitudinal axis. The annular portion is formed in particular between the shaft and an outer circumference of the worm wheel.

The at least one blocking contour is preferably designed such that, in the locking position of the blocking element, a rotational movement of the shaft from the first end stop position or from the second end stop position in a direction of rotation directed away from the respective end stop position is made possible. Thus, with a rotational movement which is directed in a direction of rotation directed away from the stop surface or the respective end stop position, the blocking element can be released from the stop surface or the blocking contour from the blocking element. In particular, the length of the at least one blocking contour in the direction of rotation of the shaft is greater than a width of the blocking element, which engages in the blocking contour, in the direction of rotation of the shaft. Therefore, after the respective end stop position is reached, a reversal of the direction of rotation or rotational movement is also made possible with the blocking element in the locking position.

Based upon detection of a rotational movement of the shaft from the first end stop position or from the second end stop position in a direction of rotation directed away from the respective end stop position, the actuator of the blocking element is deactivated. The blocking element can be transferred, in particular by the restoring device, from the locking position into the release position, and therefore a continuously proceeding rotational movement directed away from the respective end stop position is made possible.

According to a development, the blocking device and/or the blocking element and/or the actuator are/is arranged between two bearings, in particular two ball bearings, for the rotatable mounting on the shaft. This results in a particularly compact design.

BRIEF DESCRIPTION OF DRAWINGS

The disclosure is explained in more detail below with reference to the figures. The same reference signs refer here to identical, similar or functionally identical components or elements. In the figures.

DETAILED DESCRIPTION

Figure 1:
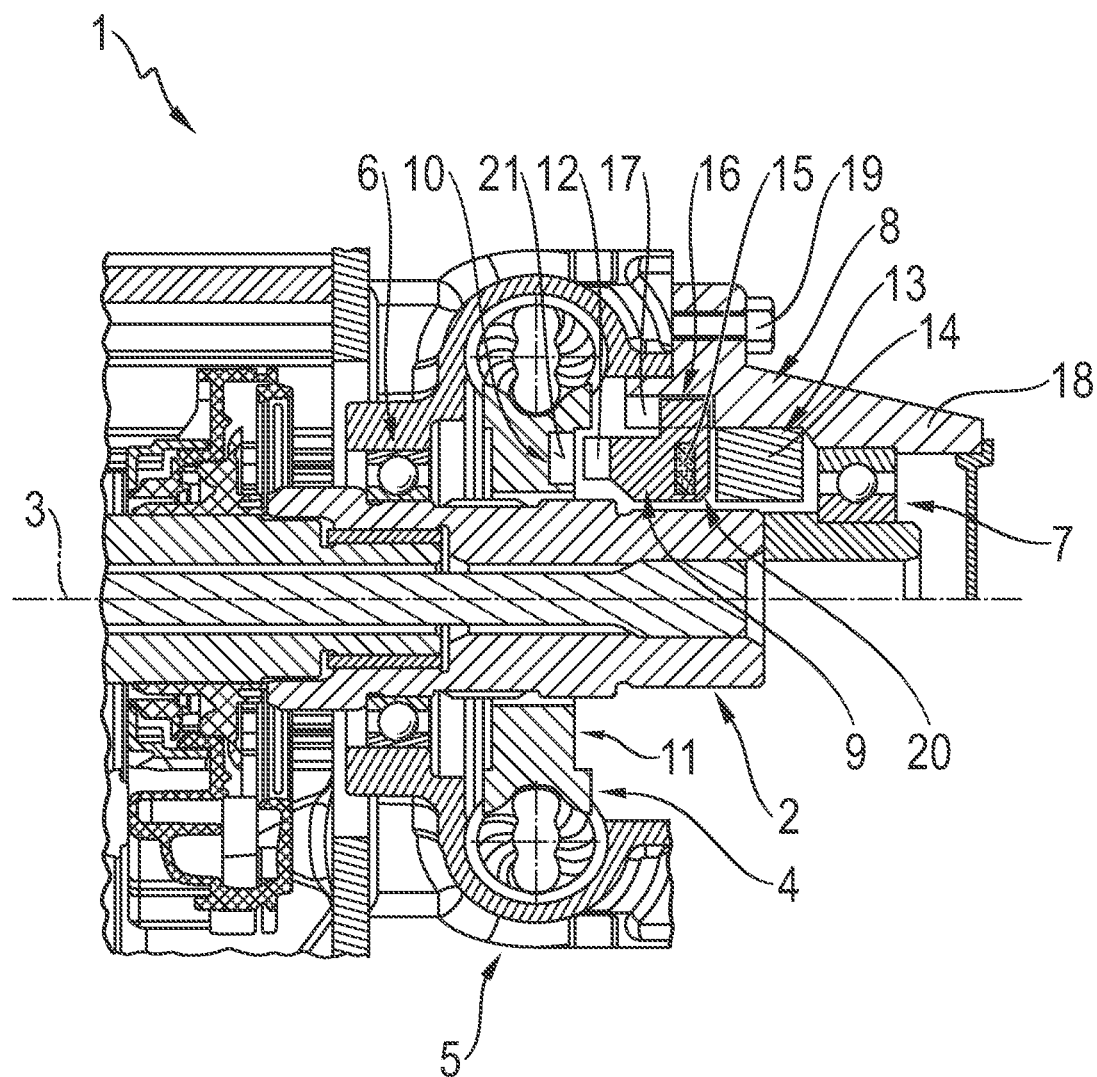
FIG. 1 shows a detail from a sectioned side view of a first steering apparatus according to the disclosure.

FIG. 1 shows a detail from a sectioned side view of a first steering apparatus 1 according to the disclosure. The steering apparatus 1 is part of a steer-by-wire steering system, not illustrated specifically here. The steering apparatus 1 is provided or designed here, by way of example, for a motor vehicle. The steering apparatus 1 has a shaft 2. The shaft 2 is rotatable or is mounted rotatably about its centre longitudinal axis 3. In this exemplary arrangement, the shaft 2 is formed from a plurality of components and therefore from multiple parts. Furthermore, in this exemplary arrangement, the shaft 2 is connectable or connected to a steering wheel, not illustrated specifically here. The shaft 2 is rotatable, in particular by the steering wheel, in two directions of rotation, which are directed facing away from each other, about the centre longitudinal axis 3.

An annular body 4 is arranged on the shaft 2. The annular body 4 is arranged on the shaft 2 for rotation therewith or in a fixed position thereon. When the shaft 2 rotates about the centre longitudinal axis 3, the annular body 4 therefore rotates at the same time. A centre longitudinal axis of the annular body 4 coincides here with the centre longitudinal axis 3 of the shaft 2. In this exemplary arrangement, the annular body 4 is designed as a worm wheel. The annular body 4 is connected to a feedback motor, not illustrated specifically here. The annular body 4 can therefore be driven by the feedback motor, as a result of which the shaft 2 is set into a rotational movement and/or a predefined or adjustable torque counteracts a rotation of the shaft 2. As a result, steering feedback can be simulated for a driver.

The steering apparatus 1 has a housing 5 in which the shaft 2 is mounted rotatably by bearings 6, 7. In this exemplary arrangement, the bearings 6, 7 are designed as ball bearings. Only part of the bearing 7 above the centre longitudinal axis 3 is illustrated here according to FIG. 1.

The steering apparatus 1 has a blocking device 8 for limiting a steering angle of rotation of the steering apparatus 1. Based on the blocking device 8, a rotational movement of the shaft 2 about the centre longitudinal axis 3 in two directions of rotation facing away from each other is therefore limited or can be limited in a variably adjustable manner. The blocking device 8 has a blocking element 9. The blocking element 9 is movable between a locking position and a release position. In the illustration shown here, the blocking element 9 is in the release position. In this release position, the shaft 2 can rotate together with the annular body 4 in one of the two directions of rotation about the centre longitudinal axis 3.

In order to stop the rotational movement of the shaft 2, the blocking element 9 in the locking position interacts with a blocking contour 10 connected to the shaft 2 for rotation therewith. In this exemplary arrangement, the annular body 4 has the blocking contour 10. The blocking contour 10 is designed here by way of example as a depression the manner of a blind hole. In particular, the blocking contour 10 has a form which is in the manner of an annular portion and is oriented about the centre longitudinal axis 3.

Furthermore, just a single blocking contour 10 can be seen here. In another example, the annular body 4 can have a plurality of blocking contours 10. The blocking contour 10 is formed here in an annular portion 11 of the annular body 4 that is oriented at a right angle to the centre longitudinal axis 3. The annular portion 11 is therefore part of the annular body 4 and is arranged between the shaft 2 and an outer circumference of the annular body 4. Furthermore, the blocking contour 10 is located on a side of the annular body 4 that faces the blocking element 9.

The blocking element 9 has a portion 12 which is in the manner of a bolt and which faces the blocking contour 10. In the locking position, not illustrated specifically here, the portion 12 in the manner of a bolt engages in the blocking contour 10.

The blocking device 8 has an actuator 13 which, in this exemplary arrangement, is designed as an electromagnetic actuator. In detail, in this exemplary arrangement, the actuator 13 is realized as a controllable electromagnet. According to this example, this electromagnet has an iron core 14. The blocking element 9 is movable by the activated actuator 13 in order to interact with the blocking contour 10 and in order to transfer from the release position into the locking position.

The blocking element 9 has a permanent magnet 15. In this exemplary arrangement, the permanent magnet 15 is arranged on a side of the blocking element 9 that faces the actuator 13.

Furthermore, the blocking element 9 is guided in a linearly displaceable manner in a guide 16. In this case, the blocking element 9 is arranged in the guide 16 in a manner displaceable parallel to the centre longitudinal axis 3 of the shaft 2. In this exemplary arrangement, the guide 16 has a guide channel 17 which is formed here in a housing cover 18. The housing cover 18 is fastened to the housing 5 by suitable fasteners 19, for example screws, in order to close the housing 5.

For the transfer of the blocking element 9 out of the release position illustrated here into a locking position, the actuator 13 is activated. As a result, the blocking element 9 is pushed with the permanent magnet 15 away from the actuator 13 parallel to the centre longitudinal axis 3 on the basis of a magnetic force which is in effect and along the guide 16 into the blocking contour 10.

In order to transfer the blocking element 9 from the locking position back into the release position, the blocking device 8 has a non-mechanically acting restoring device 20. In this exemplary arrangement, the restoring device 20 is used to exert a magnetic force on the blocking element 9 for transferring the blocking element 9 from the locking position into the release position illustrated here. The permanent magnet 15 and the iron core 14 are part of the restoring device 20 here. In order to transfer the blocking element 9 from the locking position into the release position, the actuator 13 is deactivated. As a result, the permanent magnet 15, and therefore the blocking element 9, is pulled in the direction of the iron core and therefore in the direction of the actuator 13 such that the portion 12 in the manner of a bolt becomes disengaged from the blocking contour 10.

The blocking contour 10 has two mutually opposite stop surfaces 21 for fastening the blocking element 9 in an end stop position. Only one of the two stop surfaces 21 can be seen here. The stop surfaces 21 are oriented radially and parallel to the centre longitudinal axis 3 of the shaft 2. In the locking position, the blocking element 9 or the portion 12 of the blocking element 9 that is in the manner of a bolt strikes against one of the two stop surfaces 21 depending on the direction of rotation, as a result of which a further rotational movement of the shaft 2 and of the annular body 4 in the direction of rotation directed at the blocking element 9 is blocked.

In this exemplary arrangement, the blocking contour 10 is designed such that, in the locking position of the blocking element 9, a rotational movement of the shaft 2 from the respective end stop position in a direction of rotation directed away from the respective end stop position is made possible. For this purpose, in this exemplary arrangement, the blocking contour 10 has a length, as seen in the direction of rotation of the shaft 2, which length is greater than a width of the blocking element 9 engaging in the blocking contour, as seen in the direction of rotation of the shaft 2. As a result, a reversal of the rotational movement out of the end stop position and with a blocking element 9 in the locking position is made possible.

On the basis of a detection of the rotational movement of the shaft 2 from the end stop position, the actuator 13 of the blocking element 9 is deactivated. As a result, the blocking element 9 passes, in particular by way of the restoring device 20, from the locking position into the release position before the blocking element 9 strikes against the opposite stop surface 21. The detection of the rotational movement, the deactivation and/or the activation of the actuator 13 can be undertaken by a control device, not illustrated specifically here. In particular, such a control device is connected to the actuator 13.

The steering angle of rotation of the steering apparatus 1 in two directions of rotation directed facing away from each other can be limited by the blocking element 9. In this case, both a first end stop position in a first direction of rotation and a second end stop position in a second direction of rotation opposed to the first direction of rotation can be predefined by the blocking element 9 and in interaction with the blocking contour 10.

Figure 2:
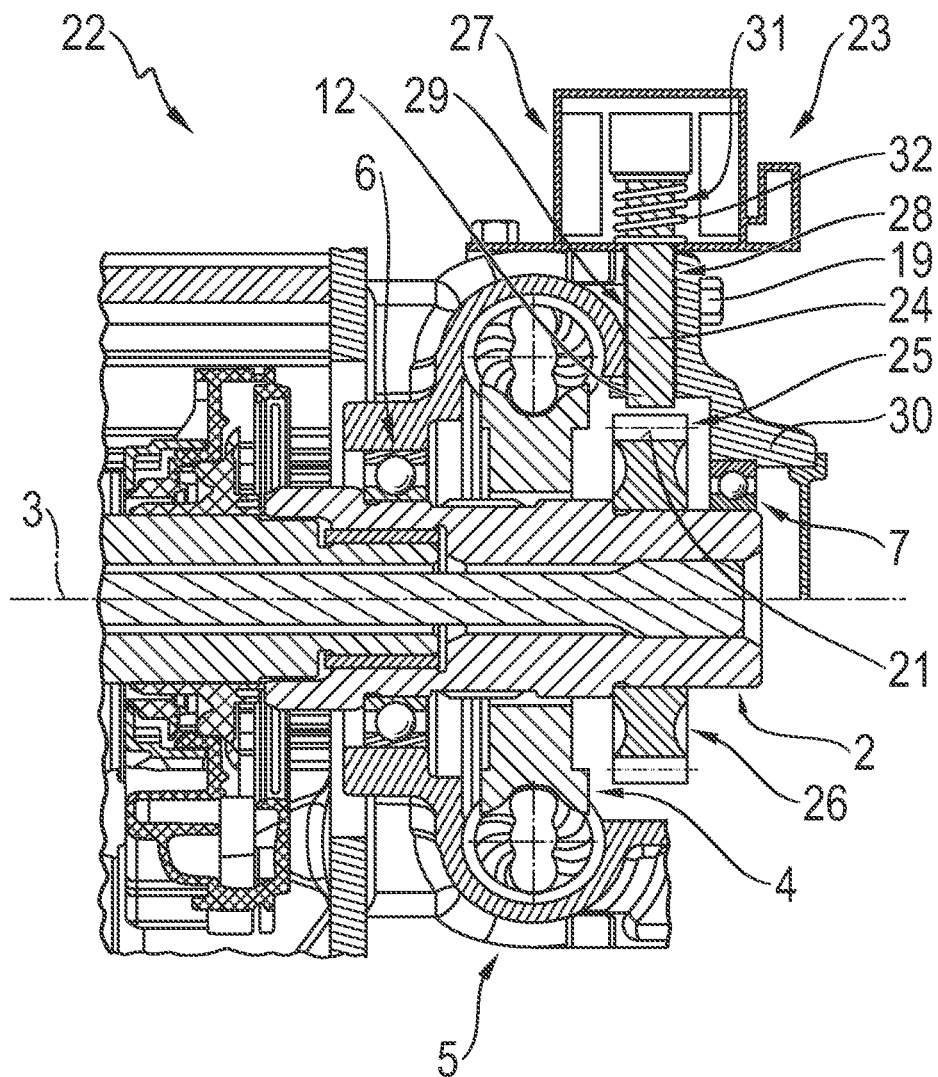
FIG. 2 shows a detail from a sectioned side view of a further steering apparatus according to the disclosure.

FIG. 2 shows a detail from a sectioned side view of a further steering apparatus 22 according to the disclosure. Identical features bear the same reference signs as previously. To this extent, reference is also made to the preceding description in order to avoid repetitions.

Instead of the blocking device 8 according to FIG. 1, the steering apparatus 22 which is illustrated here has a blocking device 23. The blocking device 23 is likewise designed for limiting a steering angle of rotation of the steering apparatus 22. For this purpose, the blocking device 23 has a blocking element 24. The blocking element 24 is movable between a locking position and a release position, the blocking element 24 being illustrated here in the release position. In order to stop the rotational movement of the shaft 2, the blocking element 24 in the locking position interacts with a blocking contour 25 which is connected to the shaft 2 for rotation therewith.

In this exemplary arrangement, a further annular body 26 has the blocking contour 25. The further annular body 26 is connected to the shaft 2 for rotation therewith such that said annular body rotates together with the shaft 2 about the centre longitudinal axis 3. Furthermore, in this exemplary arrangement, the annular body 26 is designed as a toothed wheel, with a plurality of blocking contours 25 on an outer circumference of the annular body 26 being designed as depressions. In this case, the blocking contours 25 in the manner of depressions extend from the outer circumference of the annular body 26 inwards radially with respect to the centre longitudinal axis 3.

The blocking device 23 has an actuator 27 which is designed here as an electromagnetic actuator, namely as a cylindrical coil or as a solenoid. The blocking element 24 is guided in a linearly displaceable manner in a guide 28. The guide 28 has a guide channel 29 for the blocking element 24, the guide channel 29 in this exemplary arrangement being formed by interaction of portions of the housing 5 and of a housing cover 30. In this exemplary arrangement, the blocking element 24 is guided in a linearly displaceable manner at a right angle to the centre longitudinal axis 3 by the guide 28. When an actuator 27 is activated, the blocking element 24 is moved in the direction of the blocking contour 25 until the portion 12 of the blocking element 24 which is in the manner of a bolt engages in the blocking contour 25 and strikes against one of the two stop surfaces 21.

Only one of the two stop surfaces 21 can be seen here. The stop surfaces 21 are oriented radially and parallel to the centre longitudinal axis 3 of the shaft 2. In the locking position, the blocking element 24 strikes against one of the two stop surfaces 21 depending on the direction of rotation, as a result of which a further rotational movement of the shaft 2 and of the annular body 26 in the direction of rotation directed at the blocking element 24 is blocked.

In this exemplary arrangement, the blocking contour 25 is designed such that, in the locking position of the blocking element 24, a rotational movement of the shaft 2 from the respective end stop position in a direction of rotation directed away from the respective end stop position is made possible. For this purpose, in this exemplary arrangement, the blocking contour 25 has a length, as seen in the circumferential direction of the annular body 26, which length is greater than a width of the blocking element 24 that engages in the blocking contour 25, as seen in the direction of rotation of the shaft 2. As a result, a reversal of the rotational movement from the end stop position and with a blocking element 24 in the locking position is made possible.

On the basis of a detection of the rotational movement of the shaft 2 from the end stop position, the actuator 27 of the blocking element 24 is deactivated. As a result, the blocking element 24 passes, in particular by way of a restoring device 31, from the locking position into the release position before the blocking element 24 strikes against the opposite stop surface 21. The detection of the rotational movement, the deactivation and/or the activation of the actuator 27 can be undertaken by a control device, not illustrated specifically here.

In this exemplary arrangement, the restoring device 31 has a restoring element 32 acting on the blocking element 24. The restoring element 32 is designed here as a helical compression spring.

The invention claimed is:

1. A steering apparatus comprising: a blocking device for limiting a steering angle of rotation, wherein the blocking device includes a blocking element movable between a locking position and a release position and a shaft that is mounted rotatably about its centre longitudinal axis, wherein, in the locking position, the blocking element interacts with a blocking contour in order to stop a rotational movement of the shaft, wherein the blocking element is movable by an actuator for interaction with the blocking contour, wherein the steering angle of rotation can be limited in two directions of rotation directed facing away from each other by the blocking element, wherein both a first end stop position in a first direction of the directions of rotation and a second end stop position in a second direction of the directions of rotation opposed to the first direction of rotation can be predefined by the blocking element and in interaction with the blocking contour, wherein the blocking element is guided in a linearly displaceable manner in a guide, wherein the blocking element is arranged in the guide in a manner displaceable parallel to the centre longitudinal axis of the shaft.

2. A steering apparatus comprising: a blocking device for limiting a steering angle of rotation, wherein the blocking device includes a blocking element movable between a locking position and a release position and a shaft that is mounted rotatably about its centre longitudinal axis, wherein, in the locking position, the blocking element interacts with a blocking contour in order to stop a rotational movement of the shaft, wherein the blocking element is movable by an actuator for interaction with the blocking contour, wherein the steering angle of rotation can be limited in two directions of rotation directed facing away from each other by the blocking element, wherein both a first end stop position in a first direction of the directions of rotation and a second end stop position in a second direction of the directions of rotation opposed to the first direction of rotation can be predefined by the blocking element and in interaction with the blocking contour, wherein the blocking device and/or the blocking element and/or the actuator are/is arranged between at least two bearings for the rotatable mounting of the shaft.

3. The steering apparatus according to claim 2, wherein the blocking device includes a restoring device for transferring the blocking element from the locking position into the release position, wherein the restoring device is used to exert a force that acts on the blocking element and forces the blocking element out of the blocking contour.

4. The steering apparatus according to claim 3, wherein the restoring device acts on the blocking element for transferring the blocking element from the locking position into the release position by a magnetic force.

5. The steering apparatus according to claim 2, wherein the blocking element is guided in a linearly displaceable manner in a guide.

6. The steering apparatus according to claim 5, wherein the blocking element is arranged in the guide in a manner displaceable parallel to the centre longitudinal axis of the shaft.

7. The steering apparatus according to claim 2, wherein the actuator comprises a controllable electromagnet.

8. The steering apparatus according to claim 2, wherein an annular body that is connected to the shaft for rotation therewith includes the blocking contour for for partially receiving and fastening the blocking element in the locking position.

9. The steering apparatus according to claim 8, wherein the blocking contour is designed such that, in the locking position of the blocking element, a rotational movement of the shaft from the first end stop position or from the second end stop position in a direction of rotation directed away from the respective end stop position is made possible, wherein the length of the blocking contour in the direction of rotation of the shaft is greater than a width of the blocking element, which engages in the blocking contour in the direction of rotation of the shaft.

10. A steering apparatus includes a blocking device for limiting a steering angle of rotation, wherein the blocking device includes a blocking element movable between a locking position and a release position and a shaft mounted rotatably about its centre longitudinal axis, wherein, in the locking position, the blocking element interacts with a blocking contour, which is connected to the shaft for rotation therewith, in order to stop a rotational movement of the shaft, and the blocking device includes at least one of an electromagnetic or an electromechanical actuator, wherein the blocking element is movable by the actuator for interaction with the blocking contour, wherein the steering angle of rotation can be limited in two directions of rotation directed facing away from each other by the blocking element, wherein both a first end stop position in a first direction of the two directions of rotation and a second end stop position in a second direction of the two directions of rotation opposed to the first direction of rotation can be predefined by the blocking element and in interaction with the blocking contour, wherein the blocking element is guided in a linearly displaceable manner in a guide, wherein the blocking element is arranged in the guide in a manner displaceable parallel to the centre longitudinal axis of the shaft.

11. The steering apparatus according to claim 10, wherein the blocking device includes a restoring device for transferring the blocking element from the locking position into the release position, wherein the restoring device is used to exert a force that acts on the blocking element and forces the blocking element out of the blocking contour.

12. The steering apparatus according to claim 11, wherein the restoring device acts on the blocking element for transferring the blocking element from the locking position into the release position by a magnetic force.

13. The steering apparatus according to claim 10, wherein the actuator comprises a controllable electromagnet.

14. The steering apparatus according to claim 10, wherein an annular body that is connected to the shaft for rotation therewith includes the blocking contour for partially receiving and fastening the blocking element in the locking position.

15. The steering apparatus according to claim 14, wherein the blocking contour is designed such that, in the locking position of the blocking element, a rotational movement of the shaft from the first end stop position or from the second end stop position in a direction of rotation directed away from the respective end stop position is made possible, wherein the length of the blocking contour in the direction of rotation of the shaft is greater than a width of the blocking element, which engages in the blocking contour, in the direction of rotation of the shaft.

16. The steering apparatus according to claim 10, wherein the blocking device and/or the blocking element and/or the at least one of the electromagnetic or the electromechanical actuator are/is arranged between at least two bearings for the rotatable mounting of the shaft.

\* \* \* \* \*